June 23, 1953    FRIEDRICH-WILHELM SCHOLKEMEIER    2,642,790
FOCUSING APPARATUS FOR REFLEX PHOTOGRAPHIC CAMERAS
Filed Nov. 6, 1950      2 Sheets-Sheet 1
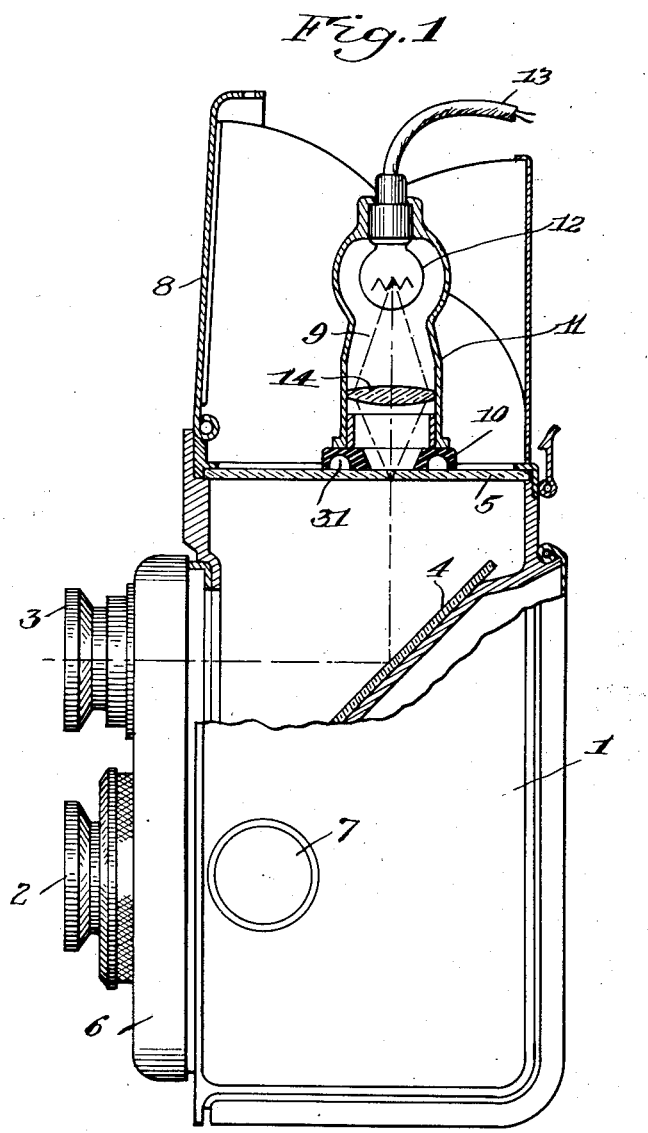
INVENTOR.
Friedrich Wilhelm Scholkemeier
BY Charles Shepard
Attorney

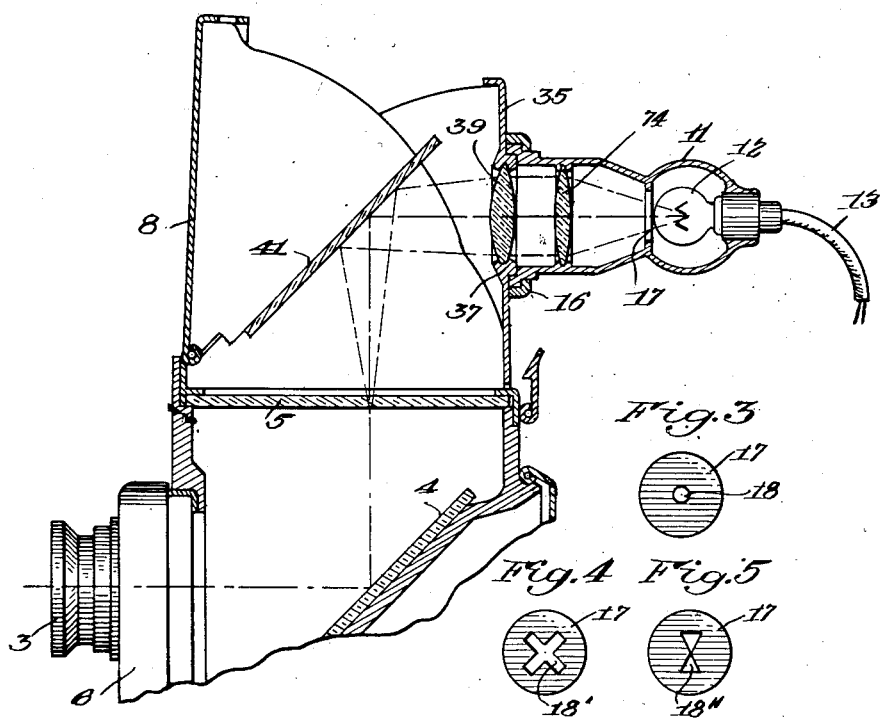

Patented June 23, 1953

2,642,790

UNITED STATES PATENT OFFICE 2,642,790

FOCUSING APPARATUS FOR REFLEX PHOTOGRAPHIC CAMERAS

Friedrich-Wilhelm Scholkemeier, Braunschweig-Lehndorf, Germany, assignor to Franke & Heidecke, Fabrik Photographischer Präzisions-Apparate, Braunschweig, Germany, a firm Application November 6, 1950, Serial No. 194,200
In Germany October 29, 1949

2 Claims. (Cl. 95—44)

The present invention relates to the focusing of photographic cameras, particularly cameras of the reflex type.

An object of the invention is the provision of simple and inexpensive means for facilitating the focusing of the camera upon an object in a dark room or a dimly lighted room.

Another object is the provision of such means in a form which may be easily applied to existing cameras.

A further object is the provision of focusing apparatus in a form which may be easily and accurately used by a relatively inexperienced person.

These and other desirable objects may be attained in the manner disclosed as an illustrative embodiment of the invention in the following description and in the accompanying drawings forming a part hereof, in which:

Fig. 1 is a side view, with parts broken away and parts in vertical section, of a construction in accordance with one embodiment of the present invention;

Fig. 2 is a view similar to the upper portion of Fig. 1, showing another embodiment of the invention;

Figs. 3 to 5 are face views of light screens constituting part of the invention;

Figs. 6 to 8 are face views of light dividing members also constituting part of the invention; and Fig. 9 is a view similar to a fragment of the left hand part of Fig. 1, with parts in vertical section, illustrating the manner of use of the light dividing members shown in Figs. 6 to 8.

The same reference numerals throughout the several views indicate the same parts.

Except for the features specifically mentioned hereafter, the camera with which the present focusing apparatus is used may be a camera of any conventional or known construction, especially a camera of the reflex type having a main camera body 1, a picture taking lens 2 for admitting light to an exposure chamber in the lower part of the camera body, a finder lens 3 for admitting light to the finder chamber in the upper part of the camera body, and a mirror 4 for reflecting the finder image upwardly onto a suitable viewing screen 5 of conventional kind, which may be, for example, a ground glass screen or any of the modern substitutes for a ground glass screen, such as a Fresnel lens of plastic material or the like. Any of these available and known forms of screen are intended to be included within the broad terms "viewing screen" or "focusing screen" as herein used.

In a camera of this known type, the picture taking lens 2 and the finder lens 3 are usually both mounted upon a front wall section 6 which is movable forwardly and backwardly (in the focusing knob 7), in known manner. When the lenses are focused to the position wherein an image of the object to be photographed is sharply focused on the viewing screen 5, the image of the object is also sharply focused on the film in the focal plane of the exposure chamber; and conversely, whenever the image is not properly focused on the film, it also will not be properly focused on the viewing screen 5 of the finder chamber. A hood shown in general at 8 surrounds the viewing screen 5 and rises therefrom to darken the upper surface of the viewing screen, to aid in accurate focusing and view finding. The parts thus far described are all well known.

With this known arrangement, focusing of the camera on objects which are well illuminated is easy, but it is rather difficult to focus accurately on objects in darkness or in dimly lighted places, as for example when preparing to take a flashlight photograph of such dark or dimly lighted objects. The present invention obviates this difficulty.

According to the present invention, means is provided for forming a sharply defined spot of light on the focusing screen 5, so that an image of such spot of light will be projected by the mirror 4, forwardly through the finder lens 3, onto the object to be photographed, where it will be sharply defined if the camera is properly focused for the distance of the objects to be photographed, and will be fuzzy or blurred if the camera is focused for a different distance from that of the object on which the image of the spot of light falls. As a further aid to sharpness of focusing, the present invention also includes the feature of breaking up the beam of light projected forwardly through the finder lens, in such a way that the projected image of the light will appear in multiple form when the camera is focused for the incorrect distance, and will appear in a single sharply defined image when the camera is properly focused for the distance of the object on which the image of the light spot falls.

In the embodiment of the invention shown in Fig. 1, the mechanism for producing the sharply defined spot of light on the focusing screen 5 includes an annular or ring-shaped base 10 resting on the top surface of the focusing screen, which base 10 is conveniently formed in a manner to hold it releasably in the position on which it is placed on the focusing screen, against dislodgement by the minor movements caused by normal handling of the camera. Thus, for instance, the base 10 may have on its bottom surface some friction material or permanently tacky adhesive, of a kind which will not remain on the focusing screen when the base is lifted from the focusing screen; or, preferably, the base 10 may be formed as an annular suction cup, having an annular suction chamber 31 surrounding the central opening through the base. Supported on and rising from this base 10 is a hollow casing 11 containing a light source such as an incandescent electric bulb 12 supplied with current through a flexible electric cord 13. The light from the filament passes downwardly as indicated at 9, through a suitable optical system such as the lens 14, which forms a sharply defined bright spot of light on the focusing screen 5.

This spot of light is projected by the mirror 4, through the lens 3, forwardly to the object to be photographed, and is plainly visible on such object because of the dark or faintly illuminated character of the room. The focusing knob 7 of the camera is operated to move the picture taking lens 2 and the focusing lens 3 back and forth simultaneously with each other, until the operator arrives at that position in which the projected image of the light is most sharply defined, and when sharp definition of the projected light spot or image is achieved, it is known that the camera is then properly focused for the distance of the object on which this sharply defined light spot falls.

The accuracy and ease of focusing are somewhat improved if the light spot formed on the viewing screen 5 is made of some special design or shape (as for example the shapes shown in Figs. 3–5) and if, in addition, a light beam dividing unit or screen is placed over the finder lens 3 when it is used as the light projecting lens, as shown more in detail in connection with Figs. 6–9. It is desired to point out here that these features, which will be described in greater detail hereafter, are not inconsistent with but preferably form a part of the same embodiment of the invention above described in connection with Fig. 1.

Another embodiment of the invention is shown in Fig. 2, wherein the casing 11, provided as before with the light source such as the incandescent bulb 12 receiving current through the flexible electric cord 13, and provided also with a suitable optical projecting system indicated diagrammatically by the lens 14, is mounted by means of a releasable ring 16 having a bayonet type engagement or other suitable quick-detachable engagement with the rear wall 35 of the focusing hood 8, in position to surround the mounting portion 37 of a viewing lens 39 in this rear wall 35 of the focusing hood. In a camera of this type, when used for eye-level focusing upon objects which are sufficiently illuminated, the user's eye views, through the lens 39, the image on the viewing screen or focusing screen 5, as reflected by the mirror 41 located within the focusing hood. When the object on which the camera is to be focused is dark, however, or is but dimly illuminated, then the special light casing 11 is attached to the focusing hood by means of the attaching ring 16, and the beam of light is projected from the light source 12 through the lenses 14 and 39 and reflected by the mirror 41 to form the desired bright spot on the viewing screen 5. This bright spot on the screen 5 is, in turn, projected by the mirror 4 and lens 3 forwardly onto the object being focused upon, just as described above in connection with the first embodiment.

As already mentioned, focusing is facilitated if the bright spot on the viewing screen 5 is sharply defined and is of some special shape or outline. In case the incandescent bulb 12 has a very small filament which closely approaches a theoretical point source of light, the image of this point source of light, when projected by the optical projection system 14, will form a sufficiently well defined point of light on the viewing screen 5. But whenever the filament of the bulb 12 does not closely approach a point source of light, it is desirable to use other means such as a screen or blocking member for confining the beam of light (as it falls onto the screen 5) to a sharply defined area of particular shape. This screen for defining the spot or area of bright light on the viewing screen 5, is of opaque material except for an opening or transparent portion of relatively small size and of the desired shape or outline, typical examples of possible shapes or outlines being a small circle as shown at 18 in Fig. 3, or a cross as shown at 18' in Fig. 4, or a double arrow as shown at 18'' in Fig. 5. The screen or light obstructing member may be placed either close to the light source 12, or close to the viewing screen 5. In Fig. 2, the screen is placed at the location 17, close to the bulb 12, while in Fig. 1, the light-defining or obstructing screen is preferably formed as the base member 10 itself, the light-transmitting opening through the center of the base member 10 being itself in one of the forms shown at 18, 18', or 18'' in Figs. 3, 4, and 5, or of any other suitable shape to provide a confined and sharply defined spot of light on the viewing screen 5.

Another aid to accurate focusing, which is preferably used with both of the arrangements shown in Figs. 1 and 2, is a light beam dividing member or dividing screen 19 having a rim which is slipped over the front end of the mount of the finder lens 3 and is frictionally retained thereon. This beam dividing screen 19 is provided with one or more opaque portions to break up the beam of projected light into a plurality of separate beams which will all be superimposed upon each other if these beams fall upon an object located at the distance for which the camera is focused, but which will be laterally separated from each other, or at least incompletely overlapped with each other, if the object on which the beams fall is located at any other distance than the one for which the camera is focused.

Thus, for example, the light dividing screen 19 may have a single diametrical bar of opaque material as indicated at 20 in Fig. 6, to break the light beam into two parts; or it may have two crossed bars as indicated at 21 in Fig. 7 to break the light beam into four parts; or it may have a front wall 23 which is solid and opaque except for a plurality of light-transmitting holes or openings such as the three round holes 22, in Fig. 8. By the use of such light-dividing screens, the forwardly projected image of the bright spot on the viewing screen 5, will be broken up respectively into two or four or three separate images of such bright spot, when the light dividing screen is in accordance with Fig. 6 or Fig. 7 or Fig. 8, respectively, which separate images will be completely overlapped and superimposed on each other at the distance for which the camera is focused, but which will be somewhat out of register or out of superimposition on each other, at other distances. This is especially noticeable at the relatively short distances for which the camera is commonly focused for taking flashlight pictures in a dark or dimly illuminated room.

In use, when focusing the camera upon the dark or dimly illuminated object, the light source 12 is lit so as to provide a well-defined spot of bright light on the viewing screen or finder screen 5, and an image of this bright spot is projected forwardly by the mirror 4 and lens 3, preferably being broken up into a plurality of separate beams by the screen 19, although it is not essential that this screen be used. The operator points the camera towards the object to be photographed so that the projected beam of light falls on such object, and manipulates the focusing knob 7 back and forth until the projected image of the bright spot of light on the screen 5, is well defined and sharp on the object to be photographed. The sharpness of this projected image indicates that the camera is properly focused for the distance at which the object is located. In addition, if the sub-dividing screen 19 is also used, the operator notes that at the time of proper focusing, there is no lateral separation of a plurality of images of the bright spot, but only a single well-defined bright spot on the object to be photographed.

Any blurring of the edges of the projected image of the bright spot, or any lack of perfect superimposition of multiple images of the bright spot, is easily observed because of the relatively short distance at which this arrangement is intended to be used.

In the form of invention shown in Fig. 2, the bright spot is always formed on the viewing screen 5 in a single location thereon, at the center or close to the center. As compared with this arrangement, the form of the invention shown in Fig. 1 has the advantage that the illuminating casing 11 may be moved manually from one edge to another of the viewing screen 5, thus shifting the bright spot from one edge to another and thereby shifting the projected image of the bright spot so as to indicate with reasonable accuracy the limits of the field of view of the camera lens. Thus if it is desired to see how much of the object being focused upon, will appear in the finished picture, the user, while holding the camera stationary, may move the illuminating case 11 first to one edge and then to the opposite edge of the viewing screen 5, and note the two different positions at which the projected image of the bright spot falls on the object, thus knowing that all that portion of the object which is located between these two positions of the projected image of the bright spot, will be within the field of view of the camera.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An attachment for use in focusing in a darkened room a camera of the twin lens reflex type having one lens for admitting light into an exposure chamber and a second lens for admitting light into a focusing chamber, a focusing screen forming one wall of said focusing chamber and lying substantially parallel to the optical axis of the second lens, a mirror within said focusing chamber intersecting the optical axis of the second lens to reflect light rays entering through said second lens so as to fall on said screen, a focusing hood surrounding said screen to shade the same from external light, a second mirror within said hood to reflect light rays from said screen to a wall of said hood, and a light transmitting aperture in a wall of said hood in position to pass light from said screen as reflected by said second mirror, said attachment comprising a lamp housing adapted for detachable mounting on said wall of said hood in a position operatively alined with said aperture, an incandescent filament lamp within said housing, and a lens within said housing for projecting an image of said filament through said aperture and onto said second mirror and thence onto said focusing screen, so that the image thereof on said screen may in turn be projected by the first mirror through said second lens onto the object to be photographed, to assist in focusing the camera on such object.

2. A construction as defined in claim 1, further including a lens mounted in said aperture of said focusing hood, said lens in said aperture and said lens in said housing being in optical alinement with each other when said housing is normally mounted on said hood and together serving to project a sharply focused image of said filament onto said focusing screen.

FRIEDRICH-WILHELM SCHOLKEMEIER.

References Cited in the file of this patent

UNITED STATES PATENTS

| Number | Name | Date |
|---|---|---|
| 1,854,665 | Parker | Apr. 9, 1932 |
| 1,918,206 | Ermisch | July 11, 1933 |
| 2,124,468 | Parlini | July 19, 1938 |
| 2,241,185 | Cohen | May 6, 1941 |
| 2,282,045 | Fleischer | May 5, 1942 |
| 2,305,437 | Meyers et al. | Dec. 15, 1942 |
| 2,390,065 | Gelb | Dec. 4, 1945 |

FOREIGN PATENTS

| Number | Country | Date |
|---|---|---|
| 8,378 | Great Britain | of 1913 |
| 423,200 | Germany | Dec. 24, 1925 |
| 182,428 | Switzerland | Aug. 1, 1936 |
| 675,275 | Germany | May 4, 1939 |